United States Patent Office 3,798,256
Patented Mar. 19, 1974

3,798,256
HYDROCYANATION OF OLEFINS
Charles Morgan King, William Carl Seidel, and Chadwick Alma Tolman, Wilmington, Del., assignors to E. I. du Pont de Nemours and Company, Wilmington, Del.
No Drawing. Filed Aug. 2, 1971, Ser. No. 168,352
Int. Cl. C07c *121/04*
U.S. Cl. 260—465.8 R                  11 Claims

ABSTRACT OF THE DISCLOSURE

A process for hydrocyanating an ethylenically unsaturated organic compound in the presence of a zero valent nickel complex of the formulae $Ni(PXYZ)_3R^2CN$ and $Ni(PXYZ)_2A$, wherein X is OR, Y and Z are R or OR and R is an alkyl or aryl radical, a given PXYZ ligand having a cone angle with an average value between 130° and 170°; "A" is an ethylenically unsaturated organic compound containing 2 to 20 carbon atoms; $R^2$ is an alkyl, alkenyl, cyano substituted alkyl, or aryl group having 1 to 20 carbon atoms.

A Lewis acid such as $AlCl_3$, $ZnCl_2$ or $(C_6H_5)_3B$ may be used in conjunction with the complex.

BACKGROUND OF THE INVENTION

It is known that the addition of hydrogen cyanide to double bonds adjacent to an activating group such as a nitrile or a carboxy group proceeds with relative ease. However, the addition of hydrogen cyanide to non-activated double bonds proceeds only with difficulty if at all and normally requires the use of high pressure of about 1,000 p.s.i. or more and high temperatures in the range of 200 to 400° C.

In U.S. Pat. 2,571,099 an improvement over this technique is described which involves the use of nickel carbonyl with or without the addition of a tertiary aryl phosphine or arsine. Relatively poor yields are obtained with this process along with the production of a relatively high percentage of undesirable polymeric products. More recently processes for effecting hydrocyanation under mild conditions with tetrakis zero valent nickel complexes derived from phosphorus containing ligands have been described in U.S. Pats. 3,496,215, 3,496,217 and 3,496,218. Still further improvement in methods for hydrocyanation is desired particularly in respect to the development of systems providing high rate of reaction.

SUMMARY OF THE INVENTION

The present invention provides a process which produces nitriles or dinitriles in high yields under mild conditions by reaction of olefins with hydrogen cyanide in the presence of zero valent nickel complexes with two or three esters of trivalent phosphorus along with an olefin or a nitrile.

The process of the present invention is generally applicable to unsaturated organic compounds containing from 2 to 20 carbon atoms having at least one ethylenic carbon-carbon double bond. The unsaturated organic compounds are of the class consisting of aliphatic and aromatic hydrocarbons and aliphatic and aromatic hydrocarbons containing functional groups consisting of

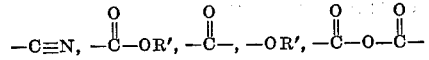

and $—NR'_2$ wherein R' is hydrogen or an alkyl or aryl radical having from 1 to 10 carbon atoms and each open bond is connected to hydrogen or an aliphatic or aromatic hydrocarbon radical, wherein the carbon-carbon double bond is insulated from the aforesaid group by at least 1 carbon atom.

Suitable unsaturated compounds include monoolefins such as ethylene, propylene, butene-1, pentene-2, hexene-2, etc., substituted olefins such as 3-pentenenitrile, 4-pentenenitrile, 2-methyl-3-butene nitrile, styrene or methylstyrene, as well as other unsaturated compounds shown in the examples.

The desired nickel compounds are nickel complexes of the formulae $Ni(PXYZ)_3R^2CN$ and $Ni(PXYZ)_2A$ wherein X is OR, Y and Z are R or OR and R is an alkyl or aryl radical having up to 18 carbon atoms and the groups are so chosen that the ligand has a cone angle with an average value between 130° and 170°; wherein "A" is an unsaturated organic compound containing from 2 to 20 carbon atoms and having at least one olefinic carbon-carbon double bond of the class consisting of aliphatic and aromatic hydrocarbons and aliphatic and aromatic hydrocarbons substituted with functional groups consisting of

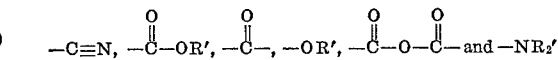

wherein R' is an alkyl or aryl radical having from 1 to 10 carbon atoms, and each open bond is connected to hydrogen or an aliphatic or aromatic hydrocarbon radical and wherein the carbon-carbon double bond is insulated from the aforesaid group by at least one carbon atom; wherein $R^2$ is an alkyl, alkenyl, cyano substituted alkyl or aryl radical having 1 to 20 carbon atoms, and the carbon-carbon double bond of the alkenyl radical is insulated from the nitrile group by at least one carbon atom.

The complexes defined above can be pre-formed, as in the case of ethylene [bis(tri-o-tolylphosphite)] nickel (O) whose use is illustrated in Examples 12–13, or they can be prepared in situ as is illustrated in Examples 1 to 11 wherein the coordinatively unsaturated zero valent nickel complex $Ni[P(O-o-C_6H_4CH_3)_3]_3$ serves as the precursor for the active catalyst species. The complexes can also be prepared in situ by reduction of a divalent nickel compound with a metal more electropositive than nickel. The reduction can be carried out in a saturated aliphatic dinitrile solvent such as adiponitrile or 2-methylglutaronitrile along with an appropriate triaryl phosphite ligand. Useful nickel compounds include halide salts such as nickel chloride, nickel bromide or nickel iodide as well as nickel salts of carboxylic acids, sulfonic acids or sulfuric acid. Suitable reducing metals, that is, metals more electropositive than nickel in the saturated aliphatic dinitrile solvent, include Na, Li, Mg, Ca, Ba, Sr, Ti, V, Fe, Co, Cu, Zn, Cd, Al, Ga, In Sn Pb and Th.

The complexes can also be prepared by treating an organonickel compound with a suitable ligand. The particular species present during hydrocyanation will depend on specific reaction conditions concentration of reactants, etc. In the course of a typical hydrocyanation it is considered that the species $Ni(PXYZ)_2A$ or $Ni(PXYZ)_3R^2CN$ or both will be present; X, Y, Z, A and $R^2$ being defined as above; the amounts will depend on the particular complex employed, the solvent if used, for example, acetonitrile and the extent of hydrocyanation.

The R groups in a given trivalent phosphorus ester ligand PXZY may be cojoined and may be the same or different and are so chosen as stated above that the ligand has a cone angle with average value between 130° and 170°, preferably between 140° and 165°. The cone angle is determined as described by C. A. Tolman, J. Am. Chem. Soc. 92–2956 (1970). The aryl groups may be substituted with alkyl, halogen or other groups provided the groups do not interfere with the catalyst function. Mixed ligands can be used. Typical trivalent phosphorus ester ligands include tri-o-tolyl phosphite (cone angle 141°), phenyl di-o-tolyl phosphonite (cone angle 142°) and tri-(2,5-xylyl) phosphite (con angle 144°).

The organic nitriles represented by $R^2CN$ include lower alkyl nitriles such as acetonitrile, propionitrile or butyronitrile which may be employed as solvents in the hydrocyanation as well as unsaturated nitriles such as 3-pentenenitrile or 4-pentenenitrile and products of the reaction of hydrogen cyanide with the unsaturated compounds mentioned above and shown in the examples such as adiponitrile.

A promoter may be used to improve the activity of the catalyst for the hydrocyanation reaction and to control distribution of the products. The promoter generally is a cationic form of the metal selected from the class of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt. Among these the cations of zinc, cadmium, titanium, tin, chromium, iron and cobalt are preferred. Suitable promoters of this type are salts of the metals listed above and include aluminum chloride, zinc chloride, cadmium iodide, titanium trichloride, titanium tetrachloride, zinc acetate, ethyl aluminum dichloride, chromic chloride, stanous chloride, zinc iodide, nickel chloride, cerous chloride, cobaltous iodide, cadmium chloride, molybdenum dichloride, zirconium chloride, thorium chloride, ferrous chloride and cobaltous chloride. The anion portion of the compound may be a halide such as fluoride, chloride, bromide and iodide, anions of lower fatty acids of from 2 to 7 carbon atoms, $HPO_3^=$, $H_2PO_2^-$, $CF_3COO^-$, $C_7H_{15}OSO_2^-$ $SO_4^=$ etc.

Also useful as a promoter in the hydrocyanation reaction described above are the borohydrides and organo boron compounds of the formulae $B(R^5)_3$ and $B(OR^5)_3$ wherein $R^5$ is of the class consisting of hydrogen, aryl radicals of from 6 to 18 carbon atoms, aryl radicals substituted with groups that do not interfere, lower alkyl radicals of from 1 to 7 carbon atoms and lower alkyl radicals of from 1 to 7 carbon atoms substituted with a cyano radical. Generally, the case where $R^5$ is phenyl or phenyl substituted with an electronegative radical is preferred, as in the structure

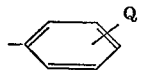

wherein Q is of the class consisting of —H, —F and —$CF_3$.

The preferred borohydrides are the alkali metal borohydrides and the quaternary ammonium borohydrides particularly the tetra (lower alkyl) ammonium borohydrides and borohydrides of the formula $B_nH_{n+4}$ where $n$ is an integer of from 2 to 10, and $B_mH_{m+6}$ where $m$ is an integer of from 4 to 10. Of these, sodium borohydride and potassium borohydride are especially preferred.

The promoter acts to improve catalyst life (moles of product/mole of nickel complex) and, in certain cases, the yield and rate. This is particularly evident in the hydrocyanation of 3- or 4-pentenenitrile to adiponitrile. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

It is believed that the organoboron compounds of the present invention have three levels of activity as follows. First, the principal most active promoter which is believed to have the formula $B(R^5)_3$ wherein $R^5$ has the meaning defined above. Second, intermediate boron hydrides of the formula $B_nH_{n+4}$ or $B_mH_{m+6}$ which, it is believed, reacts with the olefin being hydrocyanated to form an organo boron compound of the formula $B(R^5)_3$ wherein $R^5$ is derived from the olefin. For example, when $B_2H_6$ is the boron hydride and 3-pentenenitrile is the olefin the principal promoter is believed to be

and other isomers. Third, an alkali metal borohydride or quaternary ammonium borohydride which when used as the promoter is believed to form an intermediate borohydride $B_nH_{n+4}$ or $B_mH_{m+6}$ in the reaction mixture which, in turn, forms a borane $B(R^5)_3$ which becomes the principal promoter.

The hydrocyanation reaction can be carried out by charging a reactor with all of the reactants or the reactor is charged with a catalyst or catalyst components, the unsaturated organic compound, the promoter and whatever solvent is to be used and hydrogen cyanide gas is swept over the surface of the reaction mixture or bubbled through the reaction mixture. Alternately, the hydrogen cyanide may be introduced in liquid form or in the form of the corresponding cyanohydrin. If desired, when using a gaseous unsaturated organic compound, the hydrogen cyanide and the unsaturated organic compound may be fed together into the reaction medium. Another technique is to charge the reactor with a catalyst, promoter, hydrogen cyanide and solvent to be used and thereafter feed the unsaturated compound slowly to the reaction mixture. The molar ratio of unsaturated compound to catalyst generally is varied from about 10:1 to 2000:1 unsaturated compound to catalyst for a batch operation. In a continuous operation such as when using a fixed bed catalyst type of operation, a much higher proportion of catalyst may be used, such as 1:2 unsaturated compound to catalyst. The reaction medium is generally agitated such as by stirring or shaking.

In some instances it may be desirable to use an excess of the ligand (PXYZ) when carrying out the hydrocyanation reaction. The excess ligand may be added to the reactor along with the pre-formed complex, or in the case of in situ preparation of the complex an excess of the ligand may be introduced from which the complex will then be formed.

The hydrocyanated product can be recovered by conventional techniques such as by distillation or by crystallization of the product from solution.

The hydrocyanation reaction can be carried out with or without a solvent. The solvent should be liquid at the reaction temperature and inert toward the unsaturated compound and the catalyst. Generally such solvents are hydrocarbons such as benzene or xylene or nitriles such as acetonitrile or benzonitrile.

The exact temperature which is prefered is dependent to a certain extent on the particular catalyst being used, the particular unsaturated compound being reacted and the desired rate. Generally temperatures of —50° C. to 150° C. can be used. The reaction can be carried out at pressures from about 0.05 to about 100 atmospheres. The nickel complexes of this invention permit hydrocyanation at high rates with low by-product formation.

The nitriles formed by the present invention are useful as chemical intermediates. For instance, adiponitrile is an intermediate used in the production of hexamethylenediamine, which in turn is used in the production of polyhexamethylene adipamide, a commercial polyamide useful in forming fibers, films and molded articles. Other nitriles can be used to form the corresponding acids and amines which are conventional commercial products.

PREFERRED EMBODIMENTS

In the preferred embodiments of this invention the hydrocyanation is carried out at a temperature in the range of about —15° C. to about 75° C. and at a pressure in the range of about 0.05 to about 10 atmospheres.

The preferred nickel complexes are those wherein the "R" groups of the phosphite ester ligands are ortho tolyl.

The preferred promoters are cations of zinc, aluminum, cadmium, titanium, tin, chromium, iron and cobalt and boron compounds such as triphenyl borane.

The invention is further illustrated in the examples to follow. Examples 1 to 11 illustrate in situ preparation of the complex by addition of $Ni[P(O-o-C_6H_4CH_3)_3]_3$ to the reactor, where the zero valent nickel complex described above is rapidly transformed to species represented by $Ni[P(O-o-C_6H_4CH_3)_3]_2[A]$, and $$Ni[P(O-o-C_6H_4CH_3)_2]_3[R^2CN],$$

A and $R^2$ being defined as in the preceding description.

EXAMPLE 1

A 50 ml. three necked, round bottom glass flask fitted with a reflux condenser connected to a Dry Ice trap, a gas inlet above liquid level and a magnetic stirrer was set up in an oil bath at about 70° C. The flask was purged with dry, deoxygenated nitrogen and charged with 2.0 g. of $Ni[P(O-o-C_6H_4CH_3)_3]_3$*, 0.5 g. of $AlCl_3$ and 10 ml. of

A stream of dry, deoxygenated nitrogen gas was bubbled through 17 ml. of liquid hydrogen cyanide contained in a 50 ml. flask, cooled in an ice bath. The nitrogen flow was adjusted to give a gaseous hydrogen cyanide feed

*Prepared as described by L. W. Gosser and C. A. Tolman, "Inorganic Chemistry," 9–2350 (1970).

rate equivalent to 0.3 ml. (as measured at 0° C.) of liquid hydrogen cyanide per hour. The resulting gas mixture was passed through a bed of phosphorus pentoxide to eliminate traces of moisture and then was swept across the surface of the reaction mixture in the flask. After 20 hours, the reaction was shut down.

The infrared spectrum of the crude product showed an absorption band at 2240 cm.$^{-1}$ showing the presence of an organic nitrile resulting from the addition of HCN to the double bond

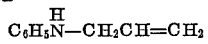

EXAMPLES 2–11

The hydrocyanations in these examples (Table I) were carried out following the procedure described in Example 1. For Examples 8–10 a reaction flask of 100 ml. volume was used. In Example 3 toluene in the amount of 80 ml. was added as solvent. The designations used in the Table refer to the following: ADN, adiponitrile, 2-MGN, 2-methylglutaronitrile, ESN, ethylsuccinonitrile.

TABLE I

| Example | Olefin | Catalyst precursor | Promoter | HCN rate, ml./hr. | Time, hrs. | Temperature, °C. | Product |
|---|---|---|---|---|---|---|---|
| 2 | ![norbornene-CH2OH] 20 ml. | $Ni[P(O-o-C_6H_4CH_3)_3]_3$ (2.0 grams) | $ZnCl_2$ (0.5 g.) | 0.6 | 21 | 25 | Show nitrile; IR band at 2,240 cm.$^{-1}$ |
| 3 | ![norbornene-anhydride] 10 g. | do | | 0.4 | 20 | 70 | Do. |
| 4 | $C_6H_5OCH_2CH=CH_2$ 20 ml. | do | $B(C_6H_5)_3$ (1.0 g.) | 0.6 | 20.5 | 25 | Do. |
| 5 | ![norbornene-C(O)C6H5] 20 ml. | do | | 1.0 | 20 | 70 | Do. |
| 6 | ![norbornene-CHO] 20 ml. | do | $SnCl_2$ (0.6 g.) | 1.1 | 20 | 50 | Do. |
| 7 | ![norbornene-COOCH3] | do | $CoCl_2$ (0.25 g.) | 0.6 | 21 | 90 | Do. |
| 8 | 3-pentenenitrile, 20 ml. | $Ni[P(C_6H_5)(O-o-C_6H_4CH_3)_2]_3$ (0.75 grams) | $ZnCl_2$ (0.5 g.) | 0.5 | 17 | 25 | Conversion 0.58%; 60% ADN, 40% 2-MGN. |
| 9 | 3-pentenenitrile, 25 ml. | $Ni[P(O-o-C_6H_4CH_3)_3]_3$ (1.0 grams) | $CoCl_2$ (0.4 g.) | 0.5 | 17 | 120 | Conversion 6.1%; 54% ADN, 38% 2-MGN, 7% ESN. |
| 10 | 3-pentenenitrile, 25 ml. | do | $TiCl_3$ (0.33 g.) | 0.5 | 17 | 100 | Conversion-5.2%; 49% ADN, 39% 2-MGN 10% ESN. |
| 11 | 3-pentenenitrile, 26 ml. | $Ni[P(O-o-C_6H_4CH_3)_3]_3$ (1.25 grams) | $AlCl_3$ (0.3 g.) | 0.5 | | 75 | ADN-2.79%; 2-MGN-1.5%; ESN-0.37%. |

EXAMPLES 12–13

Hydrocyanation of 3-pentenenitrile

The hydrocyanations summarized in Examples 12–13 (Table II) were carried out following substantially the procedure of Example 1. The olefin charged for hydrocyanation was 3-pentenenitrile in the amount of 26 ml. The catalyst complex used in each case was 1.0 g. of ethylene[bis(tri-o-tolyl phosphite)] nickel (O), made as described by W. C. Seidel and C. A. Tolman, Inorganic Chemistry, 9–2354 (1970).

The complex described above under the conditions of hydrocyanation is rapidly transferred to species including $Ni[P(O\text{-}o\text{-}C_6H_4CH_3)_3]_3$ [$R^2CN$] where $R^2CN$ represents 3-pentenenitrile or the resultant dinitrile.

In the examples hydrogen cyanide was fed at a rate of 0.3 ml. per hour over the reactants as 75° C. for 20 hours. The results are summarized below.

TABLE II

| Promototer | Product,[1] percent | | |
|---|---|---|---|
| | ADN | 2 MGN | ESN |
| Example: | | | |
| 12 ......... $ZnCl_2$ (0.35 g.).. | 4.88 | 3.56 | 0.47 |
| 13 ........................... | 1.36 | 1.50 | 0.6₃ |

[1] ADN, adiponitrile; 2 MGN, 2-methylglutaronitrile; ESN, ethylsuccinonitrile.

EXAMPLE 14

Preparation of complex by reduction of nickel compound with an active metal

A glass reactor fitted with a stirrer, a nitrogen inlet and outlet and a fritted glass bottom was purged with nitrogen, then charged with 5.18 g. of nickel chloride, 2.87 g. of zinc dust, 60 ml. of adiponitrile and 60 ml. of tri-orthotolyl phosphite. The mixture was maintained at 100° C. with an infrared lamp and stirred for 1.25 hours. The resulting red liquid was filtered by vacuum through the fritted bottom of the reactor. The filtrate was sparged with anhydrous ammonia for one hour, during which the temperature which was initially at 25° C. was brought briefly to 100° C., then filtered to yield 81.35 g. of red-brown complex solution, believed to comprise predominantly $Ni[P(O\text{-}o\text{-}C_6H_4CH_3)_3]_3$ $NC(CH_2)_4CN$.

EXAMPLE 15

Hydrocyanation of 3-pentenenitrile with $ZnCl_2$ promoter and excess ligand

The reaction was carried out in a 100 ml. glass flask fitted with a nitrogen inlet for initial purge, a mechanical stirrer, a thermocouple and a syringe pump for liquid feed. The flask was sparged with nitrogen, then charged with 20 ml. of 3-pentenenitrile, 4 ml. of catalyst solution prepared as in Example 14, 4 ml. of tri-orthotolyl phosphite, and 0.8 ml. of a 33% by weight solution of $ZnCl_2$ in 3-pentenenitrile. The reaction mixture was cooled to 6° C. and with stirring, a 1:1 mole mixture of 3-pentenenitrile:HCN was fed by syringe pump at a rate of 0.3 ml. per minute for 3 hours and 25 minutes. The injection of about 1 ml. of 4-pentenenitrile showed a marked increase in rate of reaction as shown by temperature increase. The total reaction product weighed 67.33 g. Gas chromatographic analysis showed that the crude product contained 55.6% dinitriles of which 81.4% was adiponitrile.

EXAMPLE 16

Hydrocyanation of 3-pentenenitrile with triphenyl boron promoter and excess ligand The reaction was carried out by the procedure described in Example 15 by charging the reactor with 20 ml. of 3-pentenenitrile, 4 ml. of complex solution as described in Example 14, 4 ml. of tri-orthotolyl phosphite and 5 ml. of a solution of triphenyl borane containing 5 g. of $B(C_6H_5)_3$ in 50 ml. of 3-pentenenitrile. The reaction mixture was cooled to 20° C. and with stirring a 1:1 mole mixture of 3-pentenenitrile:HCN was fed by syringe pump at a rate of 0.3 ml. per hour for 80 minutes. An additional 2.5 ml. of triphenyl boron solution was added and HCN feed was continued for another 120 minutes. Total weight of crude product was 53 g. Gas chromatographic analysis showed that the crude product contained 43.43% dinitriles of which 90.9% was adiponitrile, 8.5% was 2-methylglutaronitrile and 0.6% was ethyl succinonitrile.

EXAMPLE 17

Hydrocyanation of 3-pentenenitrile with $Cr(adiponitrile)_2Cl_3$ promoter

The $Cr(adiponitrile)_2Cl_3$ promoter was prepared by heating a mixture of 121.5 g. of $CrCl_3 \cdot 6H_2O$, 782 g. of 3-pentenenitrile, 125 ml. of adiponitrile and about 0.1 g. of zinc dust in a glass still at 70 mm. pressure to remove by distillation a total of 170 ml. of distillate of which 46 ml. was water. Fifty milliliters of the pot residue was removed and 5 ml. of 2,4-pentanedione was added to the remaining pot residue. The mixture was refluxed for one hour, then cooled and used as a promoter in the following hydrocyanation.

The hydrocyanation reaction was carried out by the procedure described in Example 15 by charging the reactor with 20 ml. of 3-pentenenitrile, 4 ml. of complex solution as described in Example 14 and 4 ml. of a solution of $Cr(adiponitrile)_2Cl_3$ prepared as shown above. The reaction mixture was maintained at 27° C. and with stirring a 1:1 mole mixture of 3-pentenenitrile:HCN was fed by syringe pump at a rate of 0.4 ml. per hour for 14.5 hours. Total weight of the crude product was 53.1 g. Gas chromatographic analysis showed that the crude product contained 45.2% dinitriles of which 84.6% was adiponitrile.

EXAMPLE 18

Hydrocyanation of 3-pentenenitrile with $TiCl_3$ promoter and excess ligand

The reactor for preparing the complex described in Example 14 was charged with 5.18 g. of $NiCl_2$, 2.87 g. of zinc dust, 60 ml. of tri-orthotolyl phosphite, and 60 ml. of 2-methylglutaronitrile. The mixture was maintained at 100° C. with an infrared lamp and stirred for 1.25 hours. Two teaspoons of air-free filter-aid were added and the mixture was filtered by vacuum through the fritted bottom of the reactor. Two teaspoons of filter-aid were added to the filtrate, the mixture was returned to the reactor, heated to 100° C. and sparged with anhydrous ammonia for 20 minutes. The mixture was then filtered through the reactor frit; the filtrate was distilled at 0.5 mm. pressure until the pot temperature reached 120° C. removing about 45 ml. of 2-methylglutaronitrile. The pot residue was extracted with 400 ml. of dry heptane; the red heptane layer was separated and the heptane removed by vacuum leaving the complex as the residue. Elemental analysis showed the product to contain 1.009% nickel and 0.128% zinc.

A hydrocyanation reactor as described in Example 15 was charged with 25 ml. of 3-pentenenitrile, 0.3 g. of $TiCl_3$, 4 ml. of the complex described above and 2 ml. of triorthotolyl phosphite. The reaction mixture was maintained at about 27° C. and with stirring a 1:1 mole mixture of 3-pentenenitrile:HCN was fed by syringe pump at a rate of 0.15 ml. per hour for 2 hours and 10 minutes. The total reaction product weighed 44.0 g. Gas chromatographic analysis showed that the crude product contained 31.5% dinitriles of which 83.1% was adiponitrile.

EXAMPLES 19–23

Hydrocyanation of 3-pentenenitrile in the presence of zero valent nickel complexed with several ligands (ligand used in excess) and with various Lewis acid promoters is further illustrated in these examples. In all cases the reactions were run for 16 hours in a semi-batch basis, with a charge of 20 ml. of 3-pentenenitrile and with hydrogen cyanide fed at a rate of 0.1 ml. per hour. The results are summarized in Table III.

The complex added in Example 19 was ethylene [bis-(tri-o-tolyl phosphite)] nickel (0); for Examples 20 and 21 tris(tri-o-tolyl phosphite) nickel (0); for Examples 22 and 23 ethylene[bis(tri-2,5-xylyl phosphite)] nickel (0). The latter complex was made as follows.

To 3 moles of 2,5-xylenol held at a temperature of about 70° C. there was added one mole of phosphorus trichloride over a period of two hours. The reaction mixture was heated at reflux overnight under nitrogen sparge after which the product, tri-2,5-xylyl phosphite, was distilled at 235° C. (0.25 mm.).

In a one-liter 3-neck flask fitted with a Dean-Stark trap a mixture of 20.0 g. of nickel acetylacetonate, [Ni(acac)$_2$(H$_2$O)$_2$] and 300 ml. of toluene was heated at reflux to remove 1.3 ml. of water. The reaction mixture was cooled to 0° C. and 50 ml. of tri-2,5-xylyl phosphite was added with ethylene gas sparging to remove oxygen. Following this 104 ml. of a 25% solution of triethyl aluminum in hexane was added with stirring over 20 minutes. The mixture was warmed to room temperature and after one-half hour was again cooled to 0° C. and thereafter methanol was carefully added at a rate of 1 ml./5 minutes for one-half hour following which slow methanol addition was continued until gas evolution ceased and a total of 600 ml. of methanol had been added. The reaction mixture was cooled to —25° C. and held at that temperature overnight, then transferred to a dry box and filtered. Recrystallization from a minimum of hot (60° C.) toluene solution, filtering through a medium glass frit and precipitating with an equal volume of methanol gave a yellow solid (60% yield).

Calculated for C$_{50}$H$_{54}$NiO$_6$P$_2$: C, 68.9; H, 6.2; Ni, 6.7; P, 7.1. Found: C, 68.3; H, 6.6; Ni, 6.6; P, 6.9.

What is claimed is:

1. A process of hydrocyanating an unsaturated reactant organic compound of the class consisting of 3-pentenenitrile and 4-pentenenitrile which comprises reacting said unsaturated organic compound with hydrogen cyanide in the presence of a nickel complex of the class consisting of $$Ni(PXYZ)_3R^2CN$$

and Ni(PXYZ)$_2$A;

wherein X is OR, Y and Z are R or OR and R is an alkyl or aryl radical having up to 18 carbon atoms; wherein the R radicals of a given PXYZ ligand may be cojoined, may be the same or different and are so chosen that the ligand has a cone angle with an average value between 130° and 170°;

wherein A is an unsaturated organic compound of the class consisting of monoolefinic hydrocarbons and olefinic hydrocarbons containing functional groups selected from the class consisting of

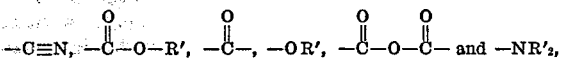

wherein R' is selected from the class consisting of hydrogen and alkyl and aryl radicals having up to 10 carbon atoms and any open bond other that that required for connection of the functional group to the olefinic radical is connected to a radical of the class consisting of hydrogen and aliphatic and aromatic hydrocarbon radicals, wherein the carbon-carbon bond

TABLE III

| Example | Ligand | Promoter | Nickel complex | Temperature, °C. | Product, percent ||| 
|---|---|---|---|---|---|---|---|
| | | | | | ADN[c] | MGN[d] | ESN[e] |
| 19 | OTTP[a] (3.0 ml.) | AlCl$_3$ (0.1 g.) | NiL$_2$C$_2$H$_4$[f] (0.4 g.) | 25 | .40 | .24 | |
| 20 | do | NaBH$_4$ (0.1 g.) | NiL$_4$[f] (1.0 g.) | 25 | .15 | | |
| 21 | do | B(OC$_4$H$_9$)$_3$ (0.5 g.) | do | 50 | 1.68 | .35 | .05 |
| 22 | 2,5XP[b] (3.0 ml.) | ZnCl$_2$ (0.1 g.) | NiL$_2$C$_2$H$_4$[g] (0.4 g.) | 25 | 3.28 | .40 | |
| 23 | do | | do | 25 | .28 | | |

[a] Orthotritolyl phosphite.
[b] 2,5-xylyl phosphite.
[c] Adiponitrile.
[d] 2-methylglutaronitrile.
[e] Ethylsuccinonitrile.
[f] L=tri-o-tolyl phosphite.
[g] L=tri-2,5-xylyl phosphite.

EXAMPLES 24–26

Hydrocyanation of 3-pentenenitrile in the presence of a nickel complex prepared in situ by ligand substitution or by reduction of a nickel compound is illustrated in these examples. In all cases 20 ml. of 3-pentenenitrile was introduced into the reactor after the complex was prepared. Hydrogen cyanide was then fed at a rate of 0.1 ml. per hour for 16 hours. The results are summarized in Table IV.

EXAMPLE 27

Hydrocyanation of 3-pentenenitrile in the presence of a nickel complex prepared in situ by reduction of a nickel compound is further illustrated in this example.

The nickel complex was prepared by reacting 2.63 g. of NiCl$_2$, 1.33 g. of zinc dust, 198.1 ml. of 3-pentenenitrile and 100 g. of tri-o-tolyl phosphite under nitrogen sparge at 120° C. for two hours. Ten grams of this reaction product, to which a further 1.2 ml. of 3-pentenenitrile was added, was reacted at 60° C. with 12.3 ml. of hydrogen cyanide over a period of 20 hours to give 9.3 g. of liquid product, of which 1.056% was ethylsuccinonitrile, 8.774% was methylglutaronitrile and 35.914% was adiponitrile.

is separated from the aforesaid group by at least one carbon atoms;

wherein R$^2$ is of the class consisting of alkyl, cyano substituted alkyl, alkenyl and aryl radicals having 1 to 20 carbon atoms, wherein the carbon-carbon double bond of the alkenyl radical is separated from the nitrile group by at least one carbon atom;

at a temperature in the range of —50° C. to 150° C. and at a pressure in the range of about 0.05 to about 100 atmospheres, the molar ratio of the unsaturated compound to the nickel complex being from 1:2 to 2000:1; and recovering the hydrocyanated reactant organic compound.

2. The process of claim 1 wherein PXYZ is orthotritolyl phosphite.

3. The process of claim 1 wherein the temperature is maintained in the range of about —15° C. to about 75° C. and the hydrogen cyanide is supplied to the reaction medium by bubbling it through the reaction medium or sweeping it over the surface of the reaction mixture.

4. The process of claim 2 wherein there is present, in addition to the nickel complex, as a promoter a cation of a metal selected from the group consisting of zinc,

TABLE IV

| Example | Nickel source | Reducing agent | Solvent | | Temperature | Time, hr. | Product, percent |||
|---|---|---|---|---|---|---|---|---|---|
| | | | | | | | ADN[c] | MGN[d] | ESN[e] |
| 24 | (Cyclooctadiene)$_2$Ni (0.3 g.) | | OTTP[a] (3.0 ml.) | | 50° C | 1 | 5.38 | 1.08 | 0.1 |
| 25 | NiCl$_2$ (0.5 g.) | Cd (dust) (0.5 g.) | CH$_3$CN (15 ml.) | OTTP (4 ml.) | Reflux | 4 | 1.92 | .28 | |
| 26 | NiCl$_2$ (0.1 g.) | Zn (dust) (0.1 g.) | CH$_3$CN (10 ml.); | OTTP (2 ml.) | do | 4 | 3.29 | .93 | 0.1 |

See footnotes a, c, d, and e at end of Table III.

cadmium, beryllium, aluminum, gallium, indium, thallium, titanium, zirconium, hafnium, erbium, germanium, tin, vanadium, niobium, scandium, chromium, molybdenum, tungsten, manganese, rhenium, thorium, iron, and cobalt, the mole ratio or promoter to nickel complex being in the range of about 1:16 to 50:1.

5. The process of claim 4 wherein the promoter is a cation of a metal selected from the group consisting of zinc, aluminum, cadmium, titanium, tin, chromium, iron and cobalt.

6. The process of claim 5 wherein the anion portion of the compound containing the metal cation is of the class consisting of fluoride, chloride, bromide, iodide, anions of lower fatty acids of from 2 to 7 carbon atoms, $HPO_3^=$, $H_2PO_2^-$, $CF_3COO^-$, $C_7H_{15}OSO_2^-$ and $SO_4^=$.

7. The process of claim 2 wherein there is present, in addition to the nickel complex as a promoter a boron compound of the class consisting of alkali metal and tetra (lower alkyl) ammonium borohydrides, borohydrides of the structure $B_nH_{n+4}$ wherein $n$ is an integer of from 2 to 10 and $B_mH_{m+6}$ wherein $m$ is an integer of from 4 to 10 and organo boron compounds of the formulae $B(R^5)_3$ and $B(OR^5)_3$ wherein $R^5$ is of the class consisting of aryl radicals of from 6 to 18 carbon atoms, lower alkyl radicals and cyano substituted lower alkyl radicals, the mole ratio of promoter to nickel complex being in the range of about 1:16 to 50:1.

8. The process of claim 7 wherein the organic boron compound is triphenyl borane.

9. The process of claim 1 wherein the nickel complex is formed in situ by feeding into a reactor a saturated aliphatic dinitrile of the class consisting of adiponitrile and 2-methylglutaronitrile, a divalent nickel compound, a finely-divided reducing metal of the class consisting of zinc and cadmium and a PXYZ ligand, X, Y and Z being defined as in claim 1.

10. The process of claim 1 wherein the nickel complex is formed by feeding to a reactor an organonickel compound with a PXYZ ligand, X, Y and Z being defined as in claim 1.

11. The process of claim 2 wherein A is an unsaturated organic compound of the class consisting of 3-pentenenitrile and 4-pentenenitrile and $R^2$ is of the class consisting of 2-butenyl, 3-butenyl and cyano substituted alkyl radicals.

References Cited
UNITED STATES PATENTS

| | | |
|---|---|---|
| 3,496,210 | 2/1970 | Drinkard, Jr. et al. 260—465.3 X |
| 3,496,215 | 2/1970 | Drinkard et al. ____ 260—465.8 |
| 3,496,217 | 2/1970 | Drinkard, Jr. et al. __ 260—465.8 |
| 3,496,218 | 2/1970 | Drinkard, Jr. _____ 260—465.8 |

JOSEPH P. BRUST, Primary Examiner

U.S. Cl. X.R.

260—346.3, 464, 465 C, 465 E, 465 F, 465.1, 465.3, 465.4, 465.5 R, 465.6

UNITED STATES PATENT OFFICE
CERTIFICATE OF CORRECTION

Patent No. 3,798,256        Dated March 19, 1974

Inventor(s) Charles Morgan King, William Carl Seidel, and Chadwick Alma Tolman

It is certified that error appears in the above-identified patent and that said Letters Patent are hereby corrected as shown below:

Column 10, line 26, the word "that", first occurrence, should read --than--; line 60, the claim reference number "1" should read --2--.

Signed and sealed this 1st day of October 1974.

(SEAL)
Attest:

McCOY M. GIBSON JR.
Attesting Officer

C. MARSHALL DANN
Commissioner of Patents